Patented June 9, 1931

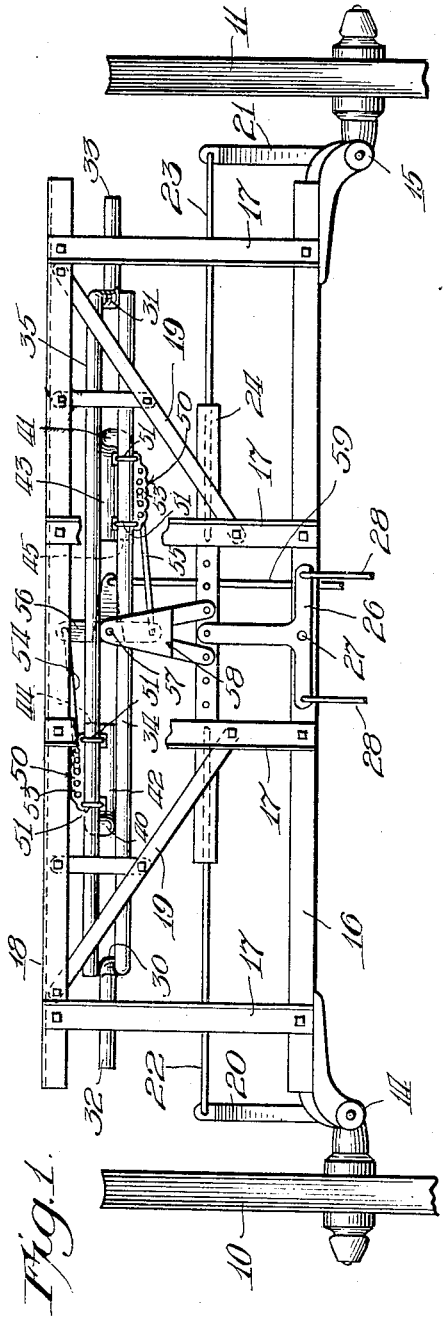
June 9, 1931. J. R. ORELIND 1,808,932
CULTIVATOR
Filed Oct. 21, 1929 2 Sheets-Sheet 1
Inventor:
John R. Orelind June 9, 1931.  J. R. ORELIND  1,808,932
CULTIVATOR
Filed Oct. 21, 1929   2 Sheets-Sheet 2
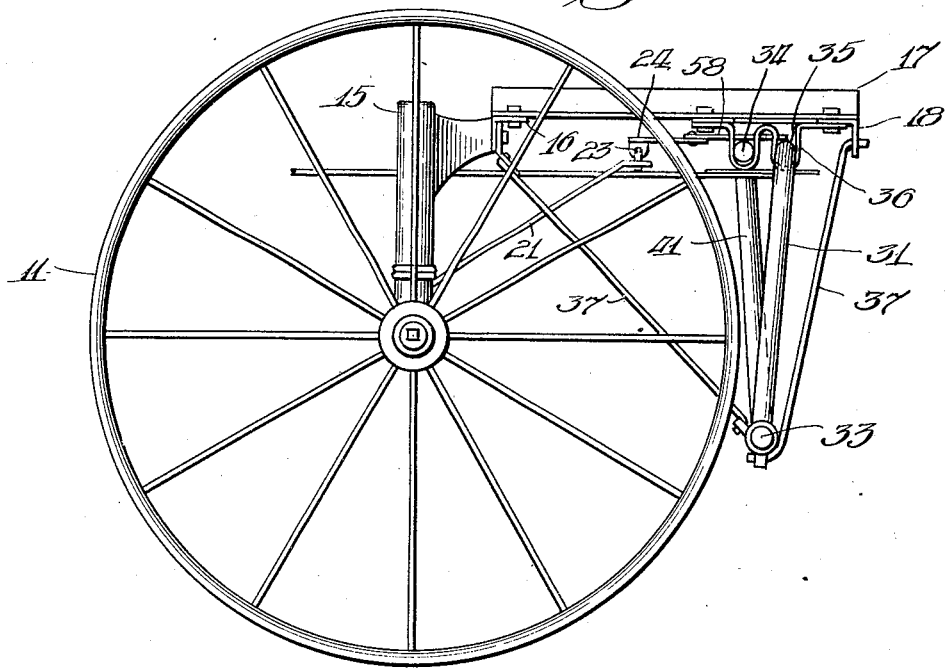

1,808,932

UNITED STATES PATENT OFFICE

JOHN R. ORELIND, OF MOLINE, ILLINOIS, ASSIGNOR TO MINNEAPOLIS-MOLINE POWER IMPLEMENT CO., OF MOLINE, ILLINOIS, A CORPORATION OF DELAWARE

CULTIVATOR

Application filed October 21, 1929. Serial No. 401,080.

This invention relates to a cultivator, particularly to a construction for supporting the drag bars of a two-row cultivator.

Two different sets of conditions have to be met in the use of a two-row cultivator, these conditions being occasioned by the kind of planter that is used for planting the crop. When a two-row planter is used, the two rows planted by the planter are spaced a uniform distance apart and are exactly parallel even though the pairs of rows may vary slightly from a straight line. When a crop is planted with a one-row planter the rows are often not parallel and some rows may be farther apart than others.

A two-row cultivator usually has four drag bars carrying cultivator shovels. The outside drag bar on one side and the immediately adjacent inner drag bar straddle one row and the other two drag bars straddle the other row. These drag bars are made so that they can be shifted laterally to move closer to or farther away from the plants. When a cultivator is used in a field that has been planted with a two-row planter, that is, where the two rows of plants are parallel to one another, the alternate drag bars can be moved laterally as a pair, that is, one outside drag bar and the inside drag bar the farthest away from it can be moved in one direction and the other outside and inside drag bars can be moved in the opposite direction which brings the respective drag bars straddling the rows closer to their respective rows. This mounting for the drag bar is known as a "cross arch" mounting.

When a two-row cultivator is used in a field that has been planted with a single row planter, it is not desirable to move the drag bars as above explained because the two rows of plants may not be exactly parallel. Accordingly, an arrangement is used which is known as a "straight arch" construction, that is, one outside drag bar and its immediately adjacent inside drag bar are moved together as a pair and the other outside drag bar and its adjacent drag bar are moved as a pair. In this way the pair of drag bars for each row is moved relative to its row which enables one set to be moved in one direction while the other set is moved in the other direction so as to accommodate the drag bars to varying distances between the rows.

Cultivators are usually made at the factory as either "cross arch" or "straight arch" implements, and the cultivator, as the farmer receives it, is capable of one class of work only. Quite often it is desirable to change one form of cultivator to the other but this involves expense and is a tedious and laborious job. The present invention is directed to the provision of a cultivator that may be quickly changed from a "cross arch" to a "straight arch" cultivator with a minimum of trouble and at no expense.

The general object of the invention is to provide an improved drag bar supporting construction for cultivators.

A more particular object is to provide an improved drag bar support by means of which a cultivator may be quickly changed from a "cross arch" to a "straight arch" cultivator.

Other objects and advantages of the invention will appear from the following specification and drawings.

An embodiment of the invention is shown in the accompanying drawings in which:—

Figure 1 is a plan view showing the cultivator as a "cross arch" cultivator;

Fig. 2 is a rear elevation of the cultivator illustrated in Fig. 1, some of the parts being omitted to show the drag bar supporting construction more clearly;

Fig. 3 is an end view of the cultivator showing particularly the drag bar supporting construction;

Fig. 4 is a partial plan view similar to Fig. 1 showing the cultivator as a "straight arch" cultivator;

Fig. 5 is a perspective view of one of the clamps used with the drag bar supports.

Inasmuch as the invention can be used with any suitable type of cultivator, and in view of the fact that two-row cultivators are well known in the art, the cultivator construction, aside from the drag bar supporting feature, will be illustrated and described only in a general way.

Referring to Figs. 1 and 2 the cultivator is supported by ground wheels 10 and 11 journaled on axles 12 and 13 which have vertical portions swiveled in sockets 14 and 15 carried by a cross member 16 of the cultivator frame. Extending forward from the cross member 16 are a number of frame bars 17 that support at their forward ends a front frame bar 18, the front bar being braced to the two inner cross bars 17 by diagonal cross braces 19.

Extending forward from the axles 12 and 13 (Fig. 1) are arms 20 and 21 adjustably connected by links 22 and 23 to a central connecting member 24. Pivoted to this connecting member is one arm 25 of a T-shaped lever 26 pivoted at 27 to the frame bar 16. The T-shaped lever 26 may be swung on its pivot 27 by means of links 28 that can be moved by hand or by foot levers as may be desired. Swinging of the T-shaped lever 26 tends to move the connecting member 24 to the right or left thereby guiding the wheels to the right or left as will be readily understood.

The outer drag bar supports or arches 30 and 31 are preferably made of round metal rods or bars which are bent to the offset shape illustrated in Figs. 1 and 2. The lower lateral portions 32 and 33 of these supports extend outward to provide bearings on which the outer drag bars are journaled. The upper lateral portions 34 and 35 extend inwardly substantially across the cultivator, these extensions being positioned adjacent one another as illustrated in Fig. 1. The drag bar arches 30 and 31 are supported for lateral movement by U-shaped straps 36 (Fig. 3) attached to the forward part of the cultivator frame. The lower ends of the arches are held in position by links 37 pivoted at one end to the lower ends of the arches and at their other ends to the frame as illustrated in Fig. 3.

The inner drag bar supports or arches 40 and 41 are substantially U-shaped, as shown in Fig. 2, the lower arms 42 and 43 of the supports forming lateral bearings upon which the inner drag bars are journaled. The upper ends 44 and 45 of the inner supports 40 and 41 are also bent laterally and these are positioned adjacent the lateral extensions 34 and 35 of the outer supports to which they may be selectively attached as will be explained later. The lower ends of the inner drag bar supports 40 and 41 are held in position by links 46 similar to links 37 for the outer supports.

The inner supports 40 and 41 are connected to the outer supports 30 and 31 by means of clamps 50 (Fig. 5). These clamps are alike, each being a simple casting having a semi-circular groove in its upper and in its lower face in which the lateral extensions of the drag bar supports may seat. Each clamp has holes for the receipt of U-bolts 51 which, after being placed around the lateral extensions of the outer drag bar supports, extend through the holes in the clamps and through corresponding holes in plates 52. These parts 50, 51 and 52 constitute a simple form of clamp by means of which the inner drag bar supports may be rigidly fixed to the lateral extensions 34 and 35 of the outer drag bar supports.

For a "cross arch" cultivator the left hand inner drag bar support in Fig. 1 is attached to the lateral extension 35 of the outer drag bar support 31, while the right hand inner drag bar support 41 is attached to the lateral extension 34 of the left hand outer drag bar support.

Each of the clamps 50 has a lateral extension 53 provided with a plurality of holes in it for the reception of the bent ends of links 54 and 55. The other ends of these links are connected to the respective ends of a T-shaped member 56 pivoted at 57 to a triangular plate 58 rigidly fixed to the member 24. The T-shaped member 56 is swung on its pivot 57 by means of a rod 59 that may be moved by a hand lever.

It will be clear that, when the T-shaped member 56 is swung on its pivot with the parts connected as illustrated in Fig. 1, the right hand outer drag bar support and the left hand inner drag bar support will be moved as a pair while the left hand outer support together with the right hand inner support will be moved as a pair. In other words, each outer drag bar support will be moved in unison with the inner support that is the farthest away from it or, to state it another way, the alternate supports will be moved together as a pair. Referring to Fig. 2 it will be seen that the effect of this is to move the supports 30 and 40 closer together and the arches 41 and 31 closer together. In other words, the drag bars are adjusted closer to each of the rows of plants being cultivated.

The cultivator may be quickly and easily changed from a "cross arch" to a "straight arch" cultivator by simply changing the clamps 50 to the position of Fig. 4. Very little work is required to do this as it is only necessary to loosen the U-bolts 52, shift the position of the clamps and the links 54 and 55 after which the U-bolts can be tightened. Inasmuch as the positions of the lateral extensions 53 on the clamps are changed, the links 54 and 55 are changed as illustrated in Fig. 4, that is, these links are swung 180 degrees from the position shown in Fig. 1.

As shown in Fig. 4, the extension 35 of the right hand outer support 31 is then connected to the right hand inner support 41 while the extension 34 of the left hand outer support 30 is connected to the left hand inner support 40. With the parts connected as illustrated in Fig. 4 it will be observed that, when the T-shaped lever 56 is rocked on its pivot 57, the left hand outer and the left hand inner supports will be moved as a pair while the right hand outer and the right hand inner support will be moved as a pair. This enables the pairs of arches to be shifted farther apart or closer together for different distances between rows of plants such as often occurs when crops are planted with single row planters.

It will be understood that with both types of connections all the drag bar supports are shifted laterally as the wheels are guided to the right or left owing to the fact that the plate 58 is rigidly connected to the member 24. When this member 24 is moved laterally as the wheels are guided, the plate 58 moves with it. This T-shaped lever 56 is carried along and it, in turn, transmits lateral movement to the drag bar supports through the links 54 and 55, the position of the supports relative to one another remaining the same owing to the fact that the lever connected to the rod 58 is latched in position.

From the above description it will be readily appreciated that a simple inexpensive construction has been provided that enables a farmer to quickly change his cultivator from a "straight arch" to a "cross arch" cultivator and vice versa with little or no trouble. It is not necessary for him to have any extra parts nor is it necessary to go to a lot of tedious work in disconnecting various parts of the cultivator and reassembling them again in a different manner. The construction is relatively inexpensive to manufacture, is rugged and durable and it has been found that it effects very considerable economy both to the manufacturer and to the user of two-row cultivators. It is not necessary for the manufacturer to carry two types of cultivators in stock, that is both "cross arch" and "straight arch" cultivators and it is not necessary for a farmer to have two types. A single construction suffices for both.

While the construction shown and described is the preferable construction, it is to be understood that variations may be made in it without departing from the spirit and scope of the invention as defined by the appended claims.

I claim:

1. A cultivator having supports for outside drag bars, said supports extending laterally across the cultivator adjacent one another, inside supports for the inside drag bars, adjustable clamping means for clamping said inner supports to either of said outside supports, and means for moving said supports laterally including connections to said clamping means.

2. A cultivator having outside drag bar supports comprising off set members, the upper ends of said members extending laterally across the cultivator adjacent one another, inside drag bar supports having upper ends extending laterally adjacent the lateral extensions of the outside drag bar supports, clamping devices for selectively clamping the extensions of the inner supports to the extensions of either of the outer supports, means for moving the drag bar supports laterally, and connections between said moving means and said clamps.

3. A cultivator having outside drag bar supports, the upper ends of said supports extending laterally across the cultivator adjacent one another, inside drag bar supports having lateral portions positioned adjacent the extensions of the outside supports, clamps for selectively attaching the lateral portions of the inner supports to either of the lateral extensions of the outer supports, a pivoted member adapted to be swung on its pivot to move the drag bar supports laterally, and links for connecting said pivoted member to said clamps in the different positions of the latter.

4. A cultivator having outside drag bar supports comprising offset members of substantially circular cross section, the upper ends of said supports extending laterally across the cultivator adjacent one another, inner drag bar supports comprising U-shaped members of substantially circular cross section, one arm of each U-shaped member extending laterally adjacent the lateral extensions of the outer supports, clamps having semi-circular recesses to receive one outer and one inner extension, said clamps being shaped so that they may be used to selectively clamp the inner extensions to either of the outer extensions, and means for moving the supports laterally including links that may be connected to the clamps in all of their selected positions.

5. A cultivator having two offset drag bar supports, one adapted to support an outer drag bar on one side of the cultivator and the other to support an outer drag bar on the other side of the cultivator, the inner offset portions of said supports extending laterally across the cultivator adjacent one another, two inner drag bar supports each having a portion adapted to be positioned adjacent to and parallel with either of said offset portions of the outer drag bar supports, adjustable clamps for selectively attaching the inner supports to either of the inner offset portions of the outer supports, and means releasably connected to said clamps for moving the drag bar supports laterally in pairs according to the manner in which they are connected together.

6. A cultivator having supports for outside drag bars, said supports extending laterally across the cultivator adjacent one another, inside supports for inside drag bars, adjustable clamping means for clamping said inner supports to either of said outer supports, and means for moving said supports laterally.

In testimony whereof, I have subscribed my name.

JOHN R. ORELIND.